Dec. 25, 1928.

S. J. NORDSTROM

VALVE

Filed May 17, 1927

1,696,726

INVENTOR
Sven Johan Nordstrom
BY Archibald Cox
ATTORNEY

Patented Dec. 25, 1928.

1,696,726

UNITED STATES PATENT OFFICE.

SVEN JOHAN NORDSTROM, OF OAKLAND, CALIFORNIA, ASSIGNOR TO MERCO NORD-STROM VALVE COMPANY, OF SAN FRANCISCO, CALIFORNIA, A CORPORATION OF DELAWARE.

VALVE.

Application filed May 17, 1927. Serial No. 191,955.

The invention relates to an improvement in valves and more particularly to an improvement in lubricated plug valves.

Many kinds of service for which plug valves are used require that a large number of the valves be articulated together and operated simultaneously. Great difficulty has heretofore been experienced in properly lubricating all the frictionally engaging and relatively movable parts of the valves so that the whole series of valves could be easily operated at one time. The object of the present invention is to produce a plug valve of such construction that all the relatively movable parts of the valve will at all times be properly lubricated, thereby reducing friction to a minimum and permitting large numbers of the valves to be connected together and simultaneously operated with a minimum expenditure of power. To this end the invention consists in the improved plug valve hereinafter described and particularly pointed out in the appended claims.

Figure 1:
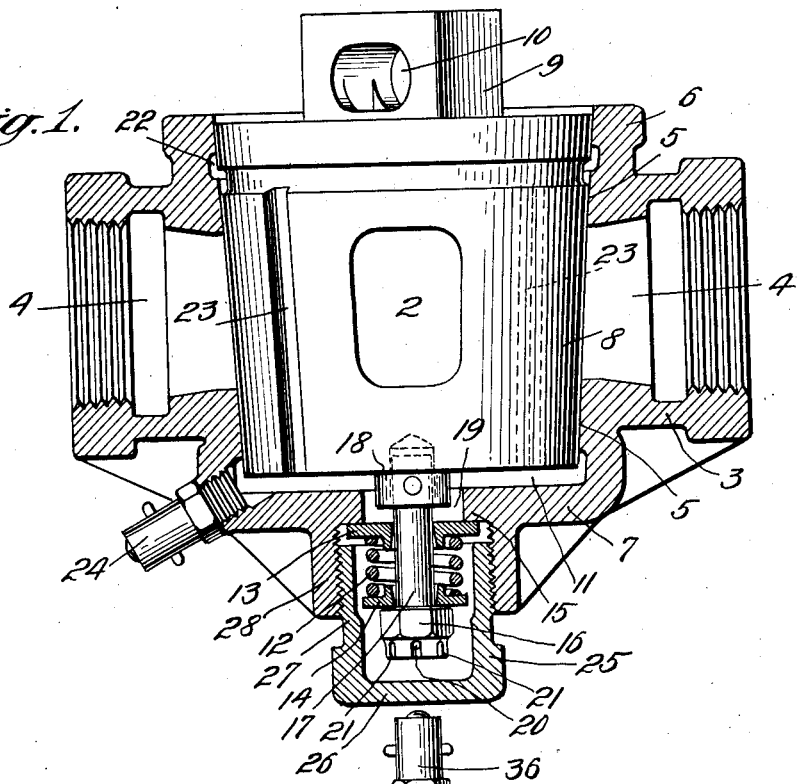
Figure 2:
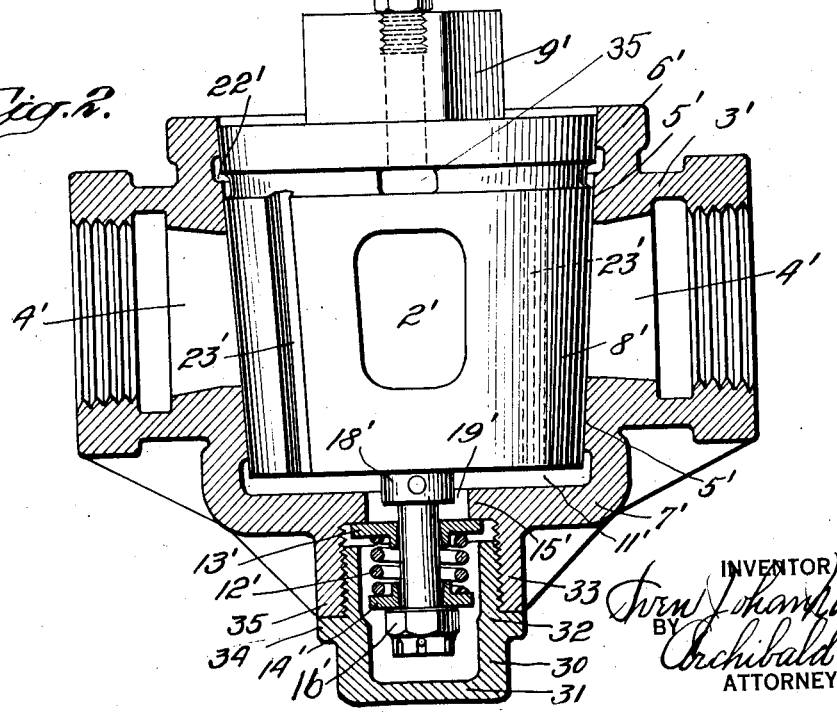

In the accompanying drawings illustrating the preferred form of the invention, Fig. 1 is a longitudinal section through the improved plug valve; and Fig. 2 is a longitudinal section through a modified form of the improved plug valve.

The plug valve shown in Fig. 1 comprises a casing 3 having a longitudinal passageway 4 therethrough and a tapered valve seat 5 formed transversely of the passageway 4. The upper or larger end of the tapered valve seat 5 opens through the side 6 of the casing 3 and the smaller or lower end of the valve seat 5 is closed by the flange-like side 7 of the casing 3. Rotatably mounted in the valve seat 5 is a plug 8 the larger end of which is provided with a square 9 adapted to receive a wrench by which the plug may be turned. In the plug 8 is a hole 2 adapted to register with the passageway 4 when the valve is in open position. When the valve forms one of a series of valves articulated together to be operated simultaneously, the operating member is adapted to pass through the elongated hole 10 formed in the square 9. The lower or smaller end of the plug 8 is spaced apart from the side 7 of the casing 3 to form a chamber 11 adapted to receive lubricant.

The plug 8 is yieldingly held against its seat 5 in the casing 3 by means of the coil expansion spring 12 the upper end of which bears against a plate or washer 13 and the lower end of which bears against a washer 14. The plate 13 acts against the inner part 15 of the lower side 7 of the casing 3 and the washer 14 acts against a nut 16 carried on the lower end of a stem 17 the upper end of which extends through and is pinned in a boss 18 projecting from the smaller end of the plug 8. The boss 18 and the stem 17 pass through a hole 19 formed in the center of the side 7 of the casing 3. A cotter pin 20 passing through a hole in the lower end of the stem 17 and adapted to be received in one or the other of the slots 21 formed in the nut 16 is provided to hold the nut and therefore the spring 12 in adjusted position.

The bearing or seating surfaces of the plug 8 and valve seat 5 are lubricated from the circumferential grooves 22 formed in the larger end of the plug and in the adjacent part of the casing and from the vertical channels 23 formed in the tapered surface of the plug. The channels 23 connect the circumferential grooves 22 with the chamber 11 formed between the smaller end of the plug and the side 7 of the casing. Lubricant under pressure is admitted into the chamber 11, and from thence into the grooves 23 and 22 and also into the space surrounding the spring 12 and its associated parts through the lubricant gun fitting 24. To keep the spring 12 and the parts associated with it immersed in the lubricant a cap 25 is provided. The cap 25 is closed at its outer end 26 and its hollow cylindrical end 27 is threaded externally and screwed into the internally threaded cylindrical flange 28 projecting downwardly from the lower side 7 of the valve casing. When the spaces between the plug 8 and the casing 3 and the space surrounding the spring 12 and its associated parts are filled with lubricant, the lubricant may be put under pressure to lift the plug from its seat to lubricate the seating surfaces of the plug and casing, either by screwing in on the cap 25 or by applying a pressure gun to the fitting 24.

By maintaining the spring 12 and the parts against which it acts immersed in lubricant the friction of these parts is kept reduced to a minimum. The grooves 22 and 23 assure proper lubrication of the seating surfaces of the plug and casing. Hence all the frictionally engaging and relatively movable parts of the valve are kept properly lubricated and friction is thereby so far reduced that large numbers of the valves may be articulated together and operated simultaneously with a minimum expenditure of power.

In the modified form of valve shown in Fig. 2 the main features of the valve are constructed and operate exactly like the corresponding parts of the valve shown in Fig. 1 and are consequently given the same reference numerals except that they are primed. In this form of the improvement in valves the lubricant is held in the space surrounding the spring 12' and its associated parts, by means of a hollow cap 30 closed at its outer end 31 and threaded at its inner cylindrical end 32 to screw into the internally threaded flange 33 projecting from the side 7' of the casing. The annular flange 34 formed peripherally on the cap 30 is adapted to engage with the outer end 35 of the annular flange 33 to form a tight joint. The lubricant is introduced into the lubricating system of the valve shown in Fig. 2 and into the space surrounding the spring 12' and its associated parts through a pressure gun fitting 36 threaded into the outer end of the squared plug shank 9' which is bored axially and connected by the transverse hole 35 with the circumferential grooves 22'.

Having thus described the invention what I claim as new is:—

1. A valve comprising, a casing having a passageway therethrough and a tapered seat formed transversely of the passageway, said casing being open at the side in which the larger end of the tapered seat is formed and closed at the other side, a tapered plug rotatably supported in the seat and having a hole adapted to register with the passageway, the smaller end of the plug being separated from the adjacent side of the casing to constitute a chamber adapted to receive lubricant, the larger end of the plug and of the seat in the casing being provided with cooperating circumferential grooves communicating with the chamber, the side of the casing adjacent the smaller end of the plug being provided with a central hole, a stem secured to the smaller end of the plug and projecting through the hole in the side of the casing, a spring surrounding the stem and bearing at one end against the outer side of the casing and at the other end against means carried by the stem, a circular flange surrounding the stem and spring and extending outwardly from the outer surface of the side of the casing, means for closing the outer end of the space determined by the circular flange, and means for introducing lubricant into the space surrounding the spring and stem and into the chamber between the smaller end of the plug and the adjacent side of the casing.

2. A valve comprising, a casing having a passageway therethrough and a tapered seat formed transversely of the passageway, a tapered plug rotatably supported in the seat and having a hole adapted to register with the passageway, said casing being open at the side in which the larger end of the tapered seat is formed and closed at the other side to form with the smaller end of the plug a chamber adapted to receive lubricant, the larger end of the plug and of the seat in the casing being provided with cooperating circumferential grooves communicating with the chamber, said closed side of the casing being provided with a central hole, a stem projecting through the hole in the side of the casing from the smaller end of the plug, a spring bearing at one end against the outer surface of the side of the casing adjacent the smaller end of the plug and acting longitudinally against the stem to yieldingly force the plug against its seat, means for enclosing the stem and spring, and means for introducing lubricant into the space surrounding the stem and spring and into the chamber between the smaller end of the plug and the adjacent side of the casing.

3. A valve comprising, a casing having a passageway therethrough and a tapered seat formed transversely of the passageway, a tapered plug rotatably supported in the seat and having a hole adapted to register with the passageway, said casing being open at the side in which the larger end of the tapered seat is formed and closed at the other side to form with the smaller end of the plug a chamber adapted to receive lubricant, said closed side of the casing being provided with a central hole, a stem projecting through the hole in the side of the casing from the smaller end of the plug, a spring bearing at one end against the outer surface of the side of the casing adjacent the smaller end of the plug and acting longitudinally against the stem to force the plug yieldingly against its seat, means for enclosing the stem and spring, and means for introducing lubricant into the space surrounding the stem and spring and into the chamber between the smaller end of the plug and the adjacent side of the casing.

SVEN JOHAN NORDSTROM.